United States Patent [19]

Whitman

[11] Patent Number: 4,461,138
[45] Date of Patent: Jul. 24, 1984

[54] HUB FOR FLEXIBLE CUTTING BLADES

[76] Inventor: Robert E. Whitman, 1-2143 Sherwood La., Swanton, Ohio 43558

[21] Appl. No.: 451,449

[22] Filed: Dec. 17, 1982

[51] Int. Cl.³ .......................................... A01D 55/18
[52] U.S. Cl. ...................................... 56/12.7; 30/347
[58] Field of Search .................... 56/12.7; 30/347, 276

[56] References Cited

U.S. PATENT DOCUMENTS

| | | | |
|---|---|---|---|
| 4,107,841 | 8/1978 | Rebhun | 56/12.7 |
| 4,112,653 | 9/1978 | Ballas et al. | 56/12.7 |
| 4,126,990 | 11/1978 | Fisher et al. | 56/12.7 |
| 4,126,991 | 11/1978 | Gobin et al. | 56/12.7 |
| 4,148,141 | 4/1979 | Hoff | 56/12.7 |
| 4,171,724 | 10/1979 | Steele | 30/347 |
| 4,199,926 | 4/1980 | Petty | 56/12.7 |
| 4,237,610 | 12/1980 | Bradus et al. | 56/12.7 |
| 4,249,311 | 2/1981 | Inaga | 56/12.7 |
| 4,374,465 | 2/1983 | Comer | 56/12.7 |
| 4,382,356 | 5/1983 | Ballas, Sr. et al. | 56/12.7 |

Primary Examiner—Paul J. Hirsch
Attorney, Agent, or Firm—George R. Royer

[57] ABSTRACT

The subject invention is a lawn mower blade hub member adapted for interconnecting a plurality of flexible blades, all affixed and disposed in a radial fashion from the centrally disposed hub member, which hub member is then mounted for concentric rotation on the lawn mower engine drive shaft; and wherein each such blade mounted to the hub member is comprised of a flexible, non-rigid, material. The hub member is a circular, plate-like member which has a plurality of insert openings which are adapted to receive and securely hold the radially inner ends of the respective flexible blade members. Disposed laterally adjacent to and just radially outwardly of the respective insert openings are vertically extending bosses, which bosses are disposed between the respective insert openings, thereby forming between adjacent bosses a channel area to securely hold a portion of the radially inner end of the flexible blade member in a radially outwardly rigid position.

1 Claim, 10 Drawing Figures

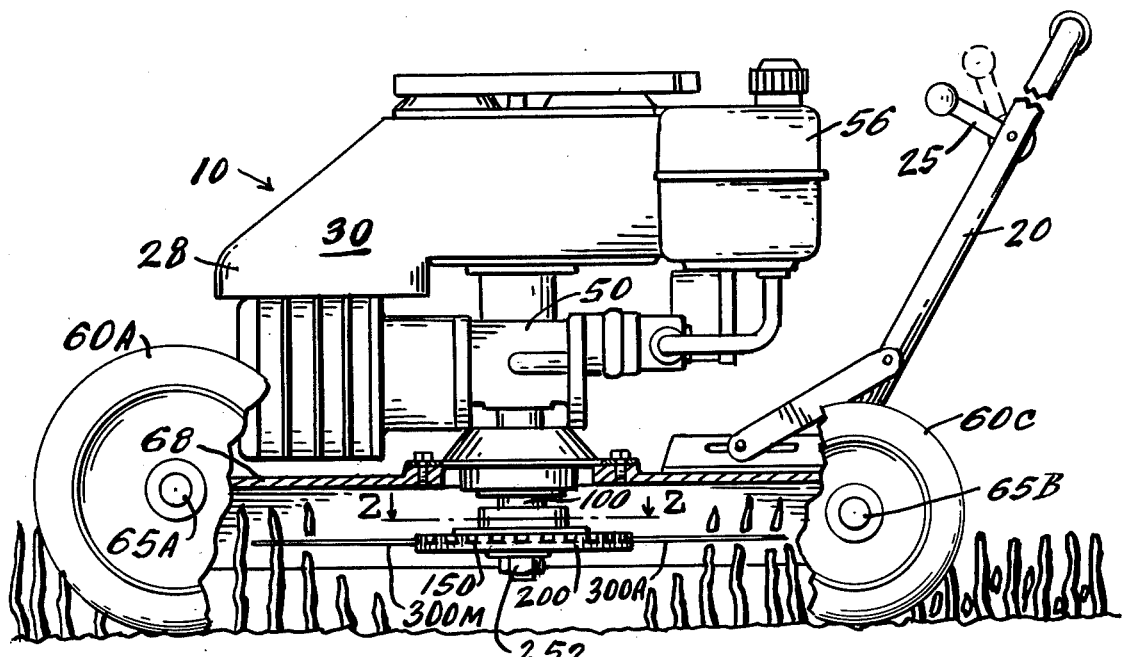
FIG-1-
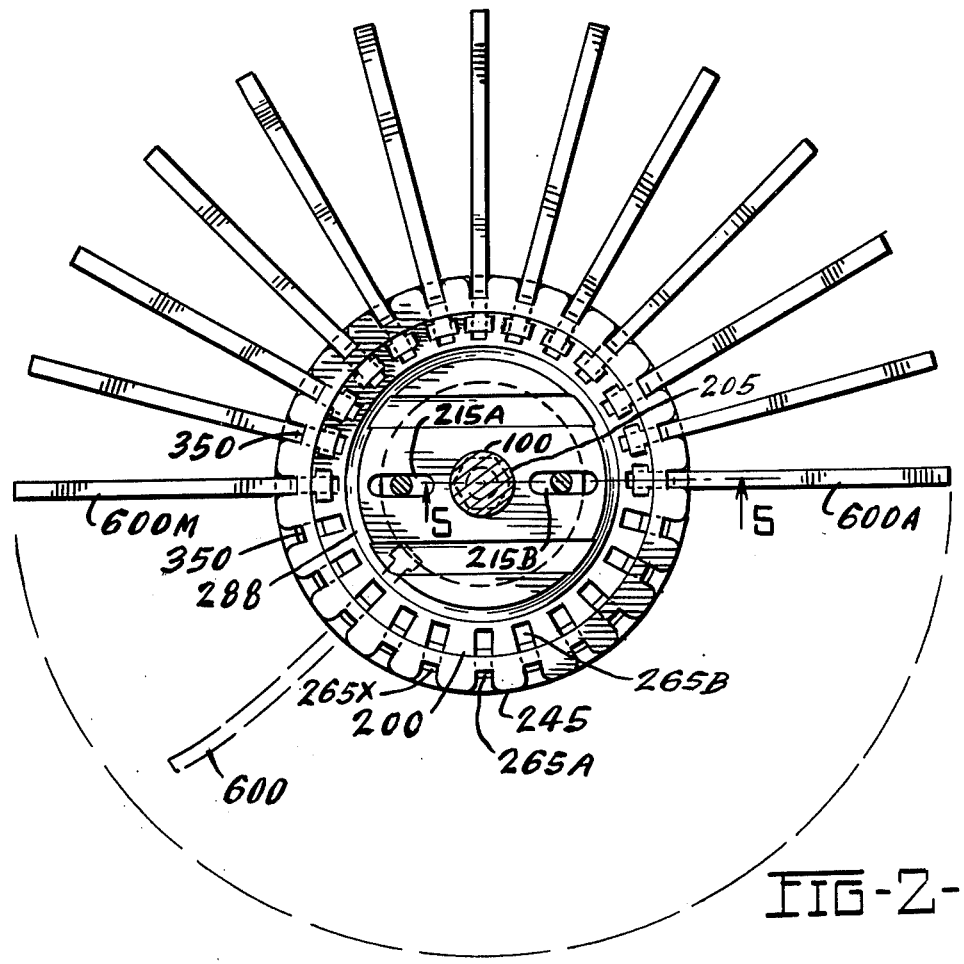
FIG-2-

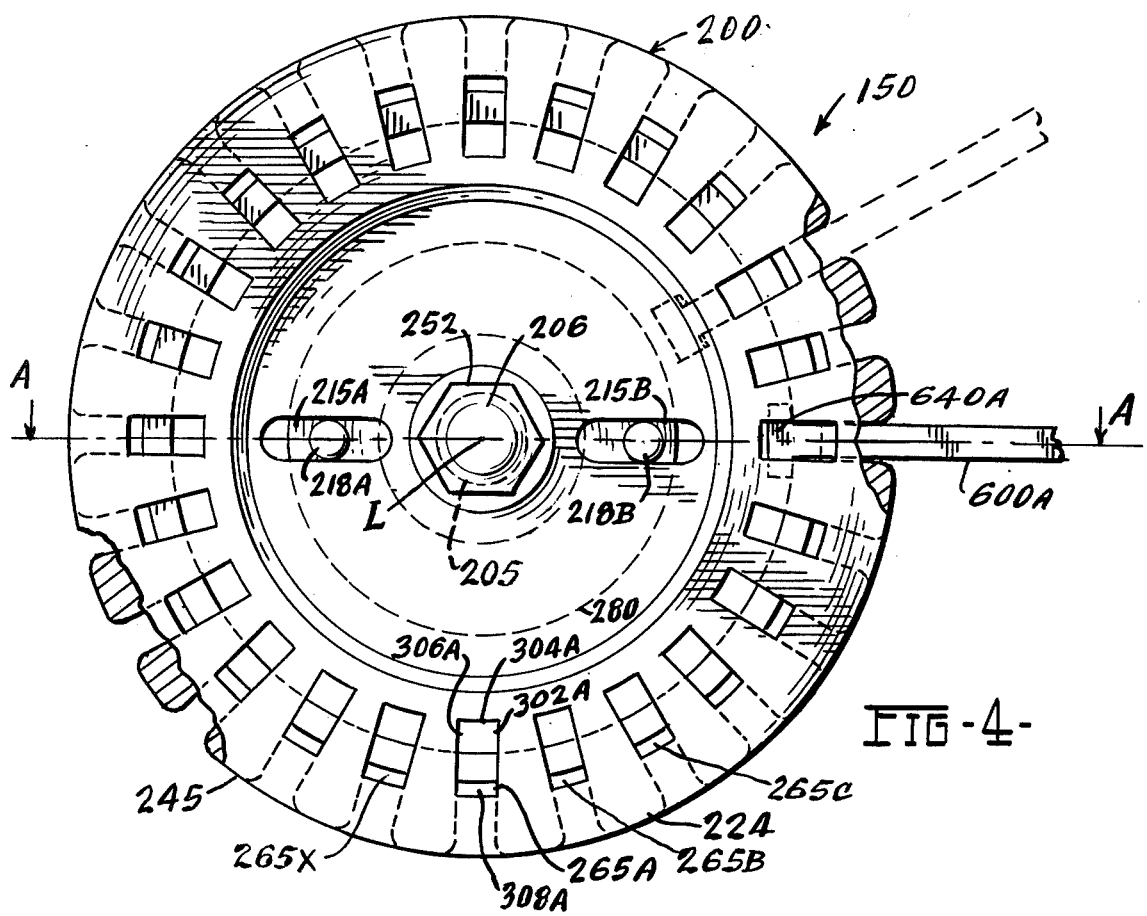
FIG-4-
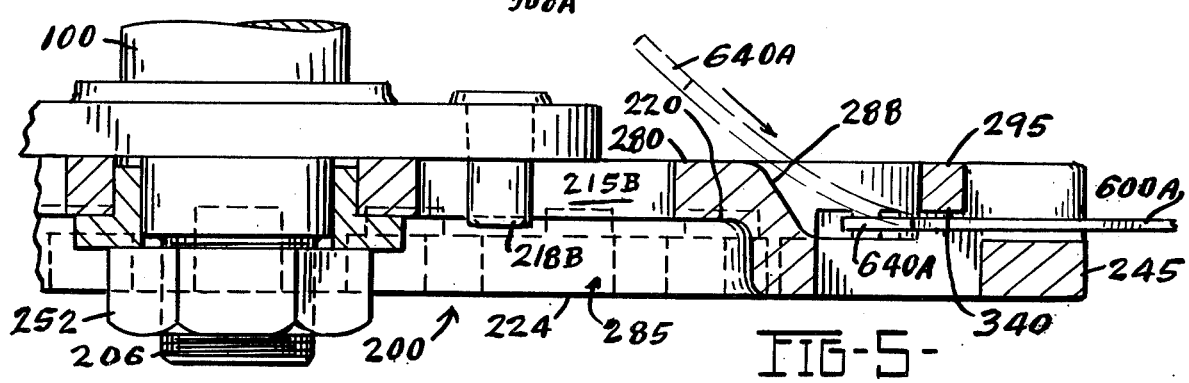
FIG-5-
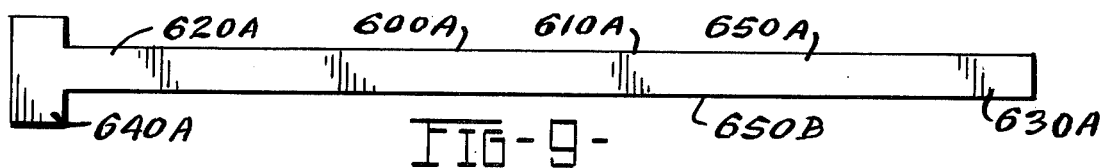
FIG-9-
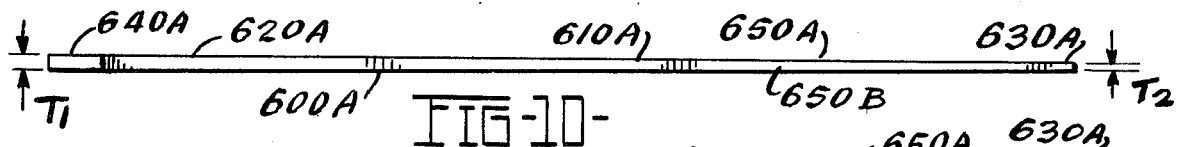
FIG-10-
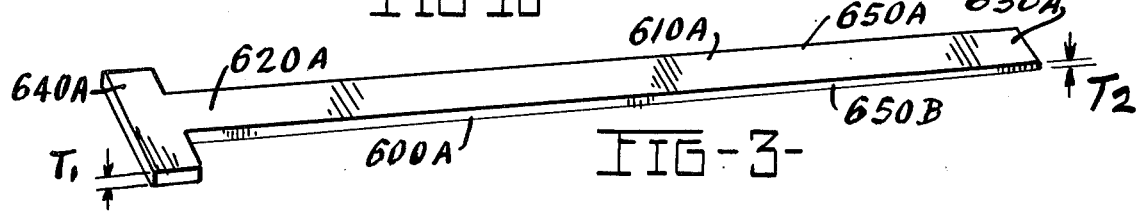
FIG-3-

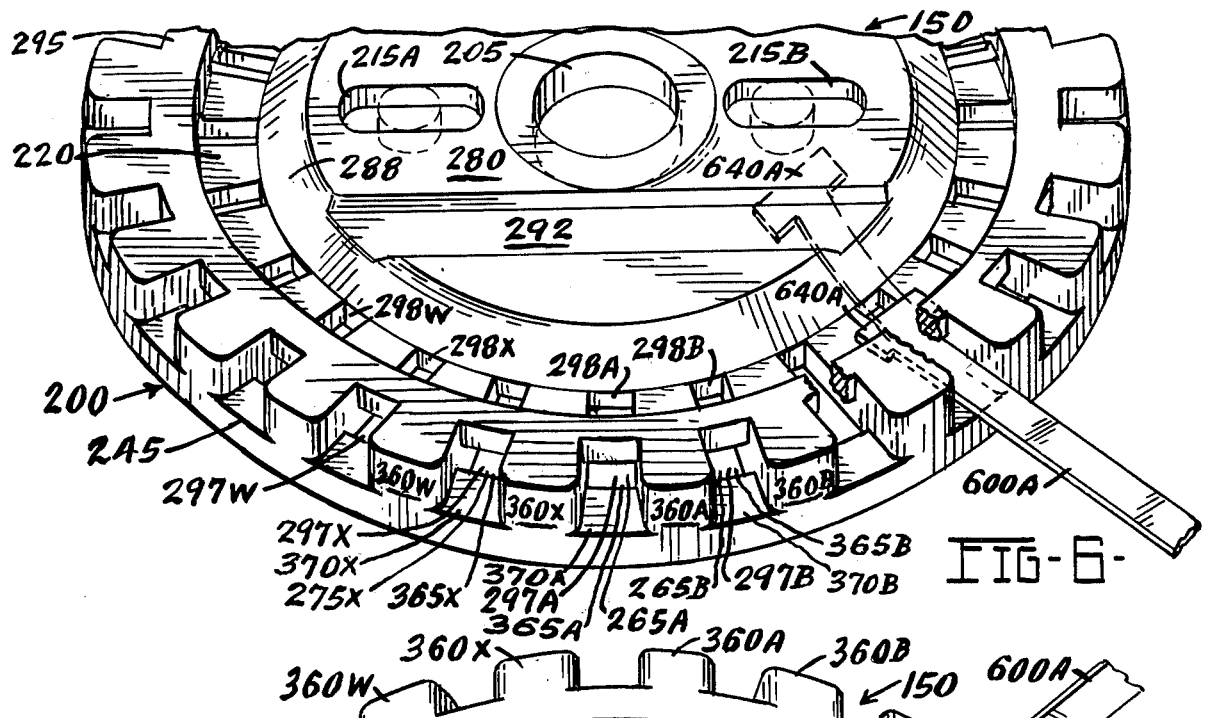
FIG-6-
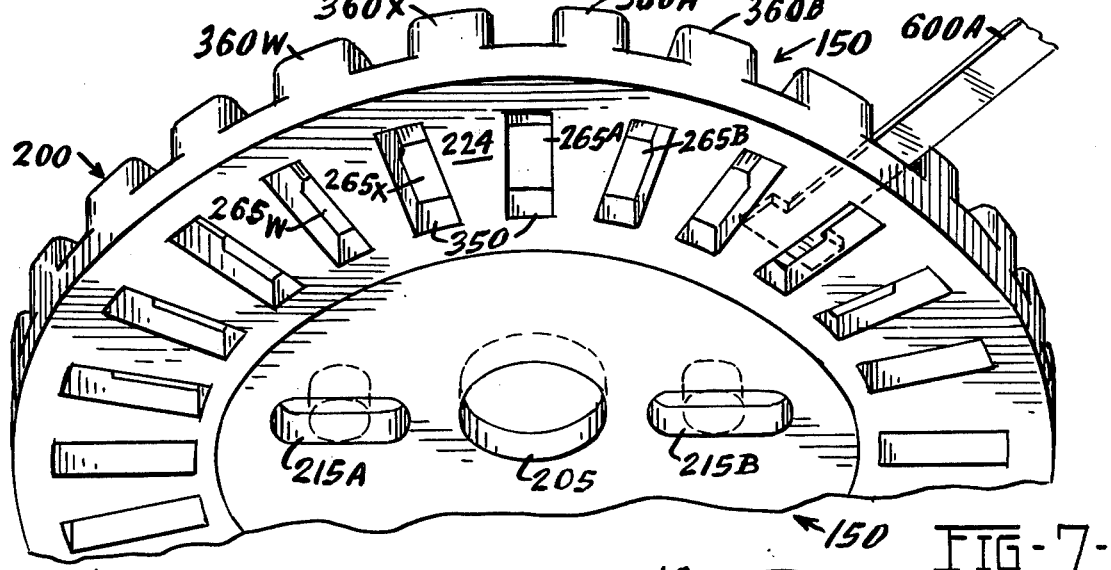
FIG-7-
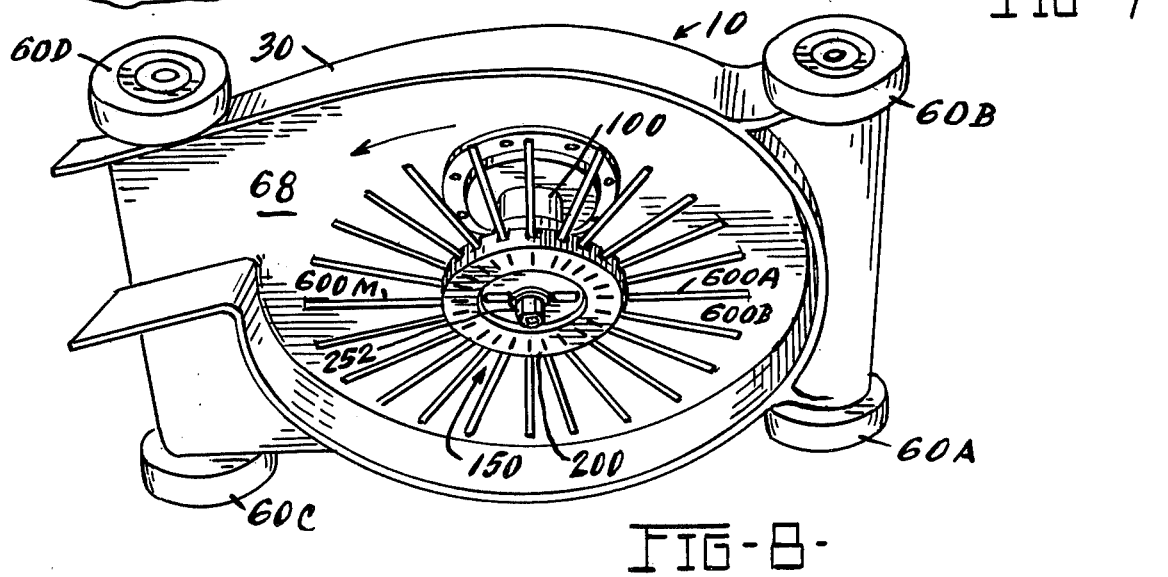
FIG-8-

HUB FOR FLEXIBLE CUTTING BLADES

DISCUSSION OF PRIOR ART AND BACKGROUND OF INVENTION

The subject invention falls generally in the field of lawn mowers or other devices in which rotating blades are used to cut vegetable material, such as grass, weeds, small tress, bushes and the like. The invention is primarily adapted as a cutting blade assembly component for such described apparatus. In general, however, the invention's application falls mostly into the lawn mower category.

Lawn mower assemblies have evolved from the early stages of being simplistic, manually operated devices, with the rotor being driven about an axis which is parallel to the ground and perpendicular to the mower's path of travel. Such earlier versions of lawn mowers were manually driven devices, and the early types of motor driven mowers were based around this latter type of rotor apparatus. Later lawn mowers, with electrically driven or gasoline driven engines, evolved, for the greater part, to assemblies in which the driven shaft is disposed vertically downward beneath the lawn mower assembly with the rotor and blade members being rotated about a vertically downward axis; with the blades being driven through a path which is substantially parallel to the ground level. In this latter type of power mower apparatus, there usually is a metallic blade assembly, in turn comprised in part of a multiple-bladed metallic rotor. This rotor, with attached blades, usually moves in a rotational path which encompasses almost the entire area beneath the mower assembly during the cutting operation. In this assembly, with the rotatable metallic blades, the moving blades, while rotating under the housing assembly, present several safety hazards and operational problems.

In this latter regard, one of the most prevalent safety problems is the potential danger of injury to the user's or a bystander's feet by the mower blades, if foot contact is accidently made with the whirling blades while they are being rotated by the mower engine. Other dangers inherent in the usage of metallic blades include situations whereby the revolving metallic blades strike a free standing object, such as a rock, and propel the object from under the mower assembly in a transverse, and partially upward direction. Such a thrown projectile poses obvious problems to bystanders of all ages and sizes, since rotating metallic blades can impart, by a substantial centrifugal force effect, a substantial amount of momentum to the propelled object. This latter safety hazard is omnipresent concern with powered lawn mowers using such metallic blades.

Other similarly generated safety hazards are frequently incurred in the use of such revolving metallic blades in a power lawn mower apparatus.

There are even other disadvantages with the use of metallic mower blades on power lawn mowers, such as the potential problem that frequently occurs when the rotating blades strike a fixed hardened object, such as a rock impacted in the ground or a stump. Often such moving impact by the rotating blades can result in blade or other mower damage, leading to further operational problems. The resultant blade damage can render a power lawn mower virtually ineffective. This problem is most acute when metallic blade assemblies are used.

There have been a limited number of lawn mower blade assemblies, and similar weed cutting machines, which have been adapted to incorporate non-metallic blades as cutting mechanisms. More specifically, a limited array of lawn mower assemblies have incorporated lawn mower blades comprised of a non-metallic material. U.S. Pat. Nos. 4,065,913; 4,126,990 and 4,062,114 represent limited examples of such types of non-metallic blade lawn mower blade assemblies.

There are several problems found to exist with the operation, usage, and maintenance of such known flexible, non-metallic lawn mower blade assemblies. Once such difficulty is centered around the fact that in the existing art of non-metallic bladed devices the individual blades are usually, in general, inefficient in cutting grass and weeds by reason of the various shortcomings in the blade composition, shape, installation and integrated assembly to promote effective cutting. Problems also exist in the fact that many such prior art blade structures are not capable, by reason of their relative flaccid structure and composition, to project rigidly erect and taut in a radially outwardly, horizontal position as the blades revolve in circular sweeping fashion about the central vertically disposed drive axis. What occurs is that said prior art blades, being relatively non-rigid and flaccid, do not achieve the most optimal horizontal position and rigidity upon impartation of centrifugal rotative force. In these circumstances, where the blades do not achieve this optimal horizontally and radially extended taut position, their respective, individual cutting surfaces do not achieve their maximal cutting effectiveness.

This invention is thus directed to a solution of the foregoing problems cited in the existing art, and the following objects of the subject invention are directed accordingly to this end.

OBJECTS

The following are the objects of the subject invention:

It is an object of the subject invention to provide an improved cutting blade device for lawn mower safety;

Another object of the subject invention is to provide an improved and safe lawn mower blade mechanism;

Yet another object of the subject invention is to provide a safe lawn mower mechanism;

Still another object of the subject invention is to provide a lawn mower cutting mechanism which possesses substantially endurance qualities;

Still another object of the subject invention is to yield a relatively safe, efficient and inexpensive lawn mower cutting mechanism.

Moreover, an object of the subject invention is to provide a unique grass cutting methodology;

A further object of the subject invention is to provide a lawn mower assembly which yields maximal and optimal cutting effectiveness using flexible blade members;

An object of the subject invention is to provide an improved lawn mower cutting blade;

Another object of the subject invention is to provide a hub assembly for lawn mower blade assemblies which enables the non-metallic and flexible respective blades to be held horizontally rigid during the cutting operations;

Yet another object of the subject invention is to provide a lawn cutting blade, for power mower, which is both flexible and efficient in grass cutting functions;

Still another object of the subject invention is to provide an improved, and safe lawn mower blade assembly;

Yet another object of the subject invention is to provide an improved lawn mower apparatus;

Other objects of the subject invention are to provide an improved apparatus for accomodating and using flexible lawn mower blades;

A still further object of the subject invention is to provide an improved grass cutting mechanism which is safe and efficient, as well as easily installed.

A further object of the subject invention is to provide a lawn mower cutting assembly which is both efficient and safe;

Another object of the subject invention is to set forth a flexible bladed lawn mower assembly;

Still another object of the subject invention is to provide an improved lawn mower blade cutting apparatus.

Other and further objects of the subject invention will become apparent from a reading of the following description taken in conjunction with the claims and drawings.

DRAWINGS

In the drawings, FIG. 1 is a side elevational view shown partially in section of a power lawn mower which incorporates the features of the subject invention;

FIG. 2 is a top elevational view of the hub member incorporating the features of the subject invention, which shows the flexible blade members affixed therein;

FIG. 3 is a perspective view of a flexible blade member used in the subject invention;

FIG. 4 is a top elevational view of the hub member shown, enlarged from FIG. 2;

FIG. 5 is a side elevational view, shown in section along line A—A of FIG. 4;

FIG. 6 is a top perspective view of the hub assembly showing the blade attachment mechanism, showing how the blades are inserted in the hub member;

FIG. 7 is a bottom perspective view of the lawn mower hub member shown in FIG. 6;

FIG. 8 is a bottom perspective view of the blade hub assembly, shown affixed to a conventional power mower member.

FIG. 9 is a top elevational view of the cutting blade shown in FIG. 3.

FIG. 10 is a side elevational view of the blade shown in FIG. 3.

DESCRIPTION OF GENERAL EMBODIMENT

The general embodiment of the subject invention is adapted for a lawn mower cutting blade apparatus, designed and constructed to have a multiple number of flexible, non-metallic blades, all disposed in a radiating manner from a central locus for rotation about such locus. Such central locus is disposed generally at the center of the vertical rotating shaft of the lawn mower engine assembly. Most generally, the general embodiment herein comprises a hub member adapted to interconnect a multiple number of flexible blade members, which blade members are affixed on their radially inner end to the centrally disposed rotatable hub member. As stated, this hub member is, in general, concentrically mounted for concentric rotation with the vertical disposed lawn mower drive shaft. Each of the numerous flexible lawn mower blade members is thus connected on its respective radially inner end to a portion of the outer periphery of the rotatable hub member; with all such blade members being generally disposed in a symmetrical radiating pattern about the centrally located vertical axis of the hub member, which coincides with the vertically disposed rotatable engine shaft axis, when the hub member is disposed on such vertical drive shaft.

In the most general embodiment of the subject invention, the lawn mower blade utilized is comprised of a pliable, non-rigid material of flexible composition. The blade utilized is a longitudinally extending member formed generally as an elongated, finger-like member as it extends radially outwardly. The inner end of the blade, referred to as the radially inner end of the blade, is adapted to be affixed in a secure manner to the central hub member; while the other end of the blade referred to as the radially outer end, projects radially outwardly from the outer circumference of the hub member. The blade's longitudinally extending edge functions as its cutting surface.

By reason of the blade's flexible composition, its cutting effectiveness is realized when each blade is revolving in a circular plane, of generally horizontal disposition, by the rotational movement of the central hub member as the hub member rotates concentrically with the drive shaft.

In the general embodiment of the subject invention, the hub member is used as a physical locus to connect the inner ends of the blade members, and incorporates the features of the subject invention in a circular plate-like member, which is generally flat, and adapted to be concentrically mounted on the vertically disposed lawn mower drive shaft for concentric rotation with such shaft. This hub member has a plurality of radially spaced blade insert receptacles, that are dispersed in a generally regular and symmetrically circumferential pattern adjacent to the circumferential periphery of the hub member. Each insert receptacle has means in connection therewith to receive and securely hold in place the respective radially inner ends of the flexible blade members. The radially outer ends of the cutting blade members are adapted to extend radially outwardly from the blade receptacles beyond the outer circumferential rim of the hub member, so as to expose the radially outer ends of such blades beyond the circumferential rim of the hub member.

The hub member has a plurality of bosses, each disposed in between the adjoining respective areas just radially outwardly of each blade receptacle. These bosses extend vertically above the upper surface of the hub member and function to hold the respective blade members, between the respective adjacent bosses, substantially erect in the radial position from the hub member.

The hub member, as stated above, is adapted to be retrofitted on the vertical drive shaft of a power driven lawn mower in place of the former blade assembly, with the flexible blades mounted thereon. Once the engine powers the drive shaft into rotative torque, it causes the hub member to be rotated in proportionate rotational speed, with the blade members thereon rotating in similar and proportionate speed. As the flexibly composed blade members rotate, they attain a degree of horizontally disposed rgidity, which enables each such blade to consummate the cutting process in such position, as the hub member rotates about such drive shaft.

DESCRIPTION OF PREFERRED EMBODIMENT

The following description will be directed to only a limited number of preferred embodiments, and the fact that only a few such embodiments, are discussed, is not to be construed as restricting the scope of the subject invention, as set forth in the claims hereto.

In describing the preferred embodiment of the subject invention, the following reference nomenclature will be used. First, the words "longitudinal central axis" will be used in reference to that axis which extends symmetrically through the longest extent of the object from one end to the other. The words "radially outer" will refer to that orientation which extends radially outwardly from a central area to the circumferential outer extremity of the object; while the words "radially inwardly" or "radially inner" will refer to the opposite orientation from "radially outer". Additionally, the words "upper" and "lower" will refer respectively to the respective portions of a given part which extends away from or towards the ground when the lawn mower utilizing the subject invention is oriented in the usual upright position.

Referring now to the drawings and particularly in which preferred embodiments of a lawn mower blade assembly incorporating the features of the subject invention are shown. A lawn mower 10 utilizing and incorporating the subject invention is shown in FIGS. 1 and 8. In FIG. 8, the subject blade assembly incorporating the features of the subject invention is seen from an angle in a perspective view beneath the lawn mower assembly showing in particular the disposition of the subject invention in the lower cavity of the lawn mower 10. As seen in such drawings, the lawn mower 10 is of generally conventional construction for an upright mower assembly which is pushed by hand. The upright carriage assembly of lawn mower 10 is comprised of a handle member 20, having various controls 25 disposed thereon. The base 28 of the lawn mower 10 is comprised in part of a housing member 30 to which is interconnected the motor assembly 50 and attached fuel tank 56. The motor assembly 50 is not graphically represented in any detail by reason of its conventional structure. The base 28 of mower 10 is in turn mounted for rolling movement on wheel members 60A, 60B, 60C and 60D mounted respectively on horizontal axles 65A and 65B, as shown in FIG. 1. The underbelly 68 of the housing member 30 is partially hollowed in order to be capable of holding therein a vertically disposed drive shaft 100 and a rotatable blade assembly 150. The lawn mower apparatus, as described above, is basically of general conventional structure, except for the hub assembly 150 to which is mounted the flexible blade members as more particularly described below.

The upright power mower 10 is adapted to manually push over the grass surface on the ground as shown in FIG. 1. While the preferred application of the subject invention is directed to such a lawn mower 10 as represented in FIGS. 1 and 8, it must be stressed that the particular features of the subject invention, as set forth and claimed herein are not to be limited in application to such lawn mowers as shown therein, but may apply, in general, to a wide variety of devices or machines utilized to cut grass, weeds and similar vegetable material. Further, it is stressed that the subject invention is not limited to the precise structural embodiments shown in the drawings and described herein, as the scope of the invention herein exceeds the parameters of the drawings, as well as the preferred embodiment described herein.

Attention is now addressed to FIGS. 2, 4, 5, 6 and 7 in which one preferred embodiment of the subject invention is shown. More directly, the blade mower blade assembly 150 which incorporates the features of the subject invention is shown in the drawings in FIGS. 2, 4, 5, 6 and 7, as being adaptable for affixation to a conventional power lawn mower apparatus, such as lawn mower 10, shown in FIG. 1, or may be appended to a lawnmower of any type. In this latter regard, as a predicate and perspective for the remaining description and discussion, it is to be indicated that the lawn mower blade hub assembly 150, shown in the drawings, is adaptable for retrofitting on most existent lawn mowers, such as lawn mower 10, or as generally described herein. Stated alternately, the subject blade assembly 150 can be used to replace any given blade assembly on a power lawn mower with minimal mechanical activity and skill. The procedure for such replacement will be discussed more fully hereinafter, and will be set forth below to demonstrate the relative ease of applying the subject invention to a conventional mower.

Furthermore, as indicated above, the lawn mower assembly 150 which incorporates the features of the subject invention is adaptable in principle to use on any type of mower or cutting assembly, aside from a grass cutting mower. Such potential applications are envisioned, with certain minor variations in structural characteristics for the blade assembly 150. As stated, however, the main application and embodiment of the subject invention is directed to a lawn mower for grass cutting.

the lawn mower blade hub assembly 150 displayed in FIGS. 2, 4, 5, 6 and 7 is thus directed primarily to a grass cutting mower, such as power mower 10, and is comprised mainly of a central hub member 200 of generally circular configuration, as viewed from a top elevational view shown in FIGS. 2 and 4. More specifically, this hub member 200 is a flat platelike member with a relatively flat upper surface 220 and flat lower surface 224 respectively. Such hub member 200 has a rounded and regular circumferential rim 245, with the hub member possessing substantially complete left-right symmetry about the dividing sectional line A-A shown in the elevational view in FIG. 4. Variously stated, from the top elevational view shown in FIG. 4, the hub member 200 has radial symmetry and regularity from its center L shown in such drawing, with the sectional line A-A yielding the basic reference for the left-right symmetry.

The central hub member 200, as shown in the drawings, is the central support and locus member for the multiple lawn mower blades, which are used in the subject invention. In this functional aspect, central hub member 200 should be of sturdy composition, preferably of a metallic or hardened plastic substance in order that the member be both durable and able to securely hold the radially inner ends of the blade members, as more fully described below. The peripheral circumferential rim 245 of the hub member 200, as indicated above, is preferably of a regular circular configuration as shown in FIG. 2, such that any projecting blades extend in equal length beyond the rim 245, as represented in the patterned relationship shown in FIG. 2.

Attention is now addressed in particular to FIGS. 2 and 6, which project a top elevational view of the hub member 200. As seen in the drawing, the hub member 200 has a centrally symmetrically disposed bore 248 of regular circular configuration. This bore 248 is a collared opening extending completely through the transverse thickness of the hub member 200 from upper surface 220 through to lower surface 224 thereof, as more particularly seen in FIG. 5. In the preferred embodiment, this bore 248 is vertically disposed when the hub member 200 is positioned on vertical drive shaft 100 on power lawn mower 10. Such bore 248 is adapted to fit concentrically and conformingly over the vertically disposed central drive shaft 100 on lawn mower 10 after the existing blade assembly on such mower is removed. As shown in FIGS. 1, 5 and 8, locking nut 252 threaded over the threaded stub shaft 206 on the bottom extremity of drive shaft 100 serves to secure the hub member 200 on said drive shaft 100. Disposed laterally of bore receptacle 248 are elongated openings 215A and 215B which are adapted to receive vertical studs 218A and 218B to further secure the hub 200 against rotational slippage on shaft 100. These elongated openings 215A and 215B are preferably aligned along the same diameter.

As stated above, the hub member 100 has an upper surface 220 and a lower surface 224, said upper and lower surfaces being referenced in this vertical perspective to the position of the hub member 200 when disposed on the vertical drive shaft 100, as shown in FIG. 1. In this position disposed on the vertical drive shaft 100, the hub member 200 is usually disposed in a horizontal operational position with the upper surface 220 of hub member 200 lying parallel to the ground. Thus, when the lawn mower 10 is in the operational position on a grassy surface, as shown in FIG. 1, the hub member 200 is parallel to the ground. More particularly, the upper surface 220 of hub 200 is that surface which is oriented and directed towards the upper inside of hollow cavity 68 in housing 30 in power mower 10, as shown in FIGS. 1 and 8. As disposed in such described position, the hub member 200 is rotatively driven, by vertical shaft 100 in a plane which is parallel to the ground and about a locus L which is defined by the center of the drive shaft 100. The planar, horizontal path through which the hub member 200 rotates defines therefore the cutting plane through which the multiple flexible blades whirl in a circular sweep, their position fixed from hub member 200, as more precisely described below.

In the preferred embodiment of the subject invention, the circumferential rim 245 of hub member 200 is substantially vertical, when the hub is installed on the vertical drive shaft 100. Alternately described, in the disposition of the hub member shown in FIG. 5, the circumferential rim 245 has a vertically straight circumferential wall which is parallel to the longitudinal central axis of the drive shaft 100. The height of the wall forming circumferential rim 245 is the base thickness of hub member 200, as can be ascertained from a view of the hub 200 in FIG. 5. Thus, the distance from the upper surface 220 to the lower surface 224 defines the base thickness or height of the hub member 200, with variations in such thickness by reason of added physical features to such hub, as more fully described below.

Positioned near the outer peripheral, circumferentially extending portion of the hub member 200, just radially inwardly of the rim 245, is a plurality of slotted openings 265A, 265B, 265C . . . 265X, which openings extend completely through the thickness of the hub member from the upper surface 220 completely through to the lower surface 224 of the hub member, as shown. Thus, these slotted openings 265A, 265B . . . 265X are open to both the upper surface 220 and the lower surface 224, as evidenced from a view of FIGS. 5, 6, and 7. These latter slotted openings 265A, 265B . . . 265X function as receptacles to securely hold the respectively radially inner ends of the cutting blade members 600A, 600B . . . 600X as more fully described in subsequent sections herein. While the preferred embodiment utilizes twenty-four such slotted openings to correspondingly hold twenty-four flexible blade members, it is to be stressed that the invention in the construction of the subject hub member 200 can be adapted to have more or less than twenty-four such openings for a comparable number of such blades.

In the embodiment shown in the drawings, and particularly FIGS. 2, 4, 5, 6 and 7, the slotted openings 265A . . . 265X appear when viewed either from a bottom elevational view of a top elevational view to have a rectangular configuration. In fact, said slotted openings 265A, 265B . . . 265X are parallelopiped in shape in the preferred embodiment, with vertically straight side walls therein. The reason for such parallelopiped shape is more fully discussed below. However, it must be noted that such configuration is not critical to construction and implementation of the subject invention. Moreover, it is to be noted that the slotted openings 265A, 265B . . . 265X are spaced uniformly and symmetrically around the hub 200. This symmetrical disposition serves to uniformly disperse the blade members connected therein. The center of the hub 200, which center is concentric to the central axis of shaft receptacle 205, is designated by the letter L as the locus point for the centering of the hub rim 245 and the symmetrical dispersal of the slotted openings 265A, 265B . . . 265X.

When viewing the upper surface of the hub member 200 as shown in FIGS. 2, 4 and 6, one can observe the centrally disposed raised portion 280, which raised portion is of a flat plate-like and circular configuration. Such raised portion corresponds reciprocally and inversely to the central depression 285 formed in the lower surface of the hub member 200. The raised portion 280 and the depressed portion 285 are substantially of the same diametric and circumferential extent, as seen in FIG. 5. The height of the raised portion 280 forms on its outer circumferentially disposed periphery a rim-like wall 288, which rises abruptly above the upper surface 220 of the hub member 200, shown in the drawings referred to above. More particularly, the rim-like circumferential wall 288 of the raised portion 280 extends above the upper surface 220 of the hub member and this rim-like wall 288 provides a sharp upward break from the remaining portions of such upper surface 220, as can be particularly observed in FIG. 6. In the preferred embodiment of the subject invention, the rim-like wall 288 slants radially inwardly as it rises above the upper surface 220 of the hub member 200, as shown in FIG. 6. More specifically, as viewed in FIGS. 5 and 6, the rim-like wall 288 is slanted inwardly and upwardly, as such wall extends radially inwardly. Machined in the upper surface of the raised portion 280 are liner extending bracket slots 292A and 292B, which bracket slots extend parallel to one another in chordlike fashion from one side of the raised portion of the other, as more specifically shown in FIG. 2.

As can be seen in FIGS. 2, 6 and 7, the slotted openings 265A, 265B . . . 265X commence on their radially outer extremity a minimal distance in from the outer circumferential rim 245 of the hub 200 and radially inwardly to the vertical rim-like wall 288, as shown in such drawings. The rimlike wall 288 functions as a boss to stop and otherwise prevent the radially inner end of each flexible blade member 600A, 600B . . . 600X, as described below, and shown in FIG. 3, from moving radially inwardly from its intended position shown in FIGS. 2, 6 and 7. Thus, the rim-like wall 288 functions as a backstop to limit the radially inner movement of the respective blade members 600A, 600B . . . 600X. As stated above, each slotted opening 265A, 265B . . . 265X extends, as shown in FIGS. 5, 6 and 7, completely through the thickness of the hub member 200 from the upper surface 220 thereof completely to its lower surface. Thus, as seen, each slotted opening is exposed to both the upper and lower surfaces of the hub member 200, and a portion of the respective blade member inserted therein can reach from the upper surface 220 to the lower surface 224 of the hub member, as fully explained below.

While it is not critical that each slotted opening 265A . . . 265X be precisely configured as shown in the drawings, the most preferable shape is that of a parallelopiped member, with vertically straight inner walls, as indicated above. More precisely, in the slotted opening 265A, the four vertical walls 302A, 304A, 306A and 308A are vertical in the hub's installed position, such walls being perpendicular to the upper surface 220 and lower surface 224 of the hub member 200. Therefore, as stated above, when viewing these slotted openings from above or below, as seen in FIG. 4, they appear rectangular. Each other slotted opening in the hub 200 is similarly structured, preferably being of identical configuration and size to one another for symmetry and uniformity purposes, and further to avoid any imbalance problem when the hub member 200 rotates on shaft 100.

Overlapping the upper surface 220 of the hub 200 is a circumferential ring 295, which is generally rectangular in cross-section configuration, as seen in FIG. 5. More specifically, circumferentially disposed ring 295 extends a vertical distance above the upper surface 220 of hub member 200, which ring 295 is approximately equal to the height of the raised portion 280. Such ring 295 is juxtaposed so as to lie over a portion of each slotted opening 265A, 265B . . . 265X, as is shown in FIGS. 2 and 9. More precisely, when viewing the hub member 200 from the views shown in FIGS. 2, 4, 5 and 6, ring member 295 covers in symmetrical fashion the same portions of each slotted opening 265A, 265B . . . 265X, such that both the same radially outer and radially inner portion of each such slotted opening is exposed and open to the upper surface 220 of hub member 200. More explicitly, the resultant attribute of the overlap of ring 295 is that, as viewed from the upper surface 220 of hub member 200, each slotted opening 265A, 265B . . . 265X has an entrance on either side of ring 295, i.e., the radially outer side or the radially inner side. Specifically, by reason of the overlap of ring member 295 over slotted openings 265A, 265B . . . 265X, each slotted opening 265A, 265B . . . 265X has a radially outer entrance 297A, 297B . . . 297X and a radially inner entrance 298A, 298B . . . 298X from the upper surface 220. When viewing the overlap of ring 295 over the slotted openings 265A, 265B . . . 265X in FIG. 5, one can see that the bottom surface 340 of the ring 295 covers each slotted opening 265A, 265B . . . 265X. The opposite side of each slotted opening 265A, 265B . . . 265X facing the bottom surface 240 of hub member 200 is not so covered, as shown in FIG. 7.

In the preferred embodiment of the subject invention, the ring member 295 is joined on its outer circumferential wall 350 to a series of blade boss members 360A, 360B . . . 360X, as shown in FIGS. 2, 6 and 7. Specifically, these blade boss members 360A, 360B . . . 360X are essentially radially outwardly extending portions of the ring member 295, spaced equally from one another, with each such boss member, as shown, being of the same height above the upper surface 220 of hub member 200, as ring 295. Such blade boss members 360A, 360B . . . 360X substantially cover the radially outer portion of the upper surface 220 of the hub member 200 extending from the outer circumferential wall 350 of ring 295, but interrupted for a portion extending radially outwardly from the radially outer edge of each of the slotted openings 265A, 265B . . . 265X. More particularly, extending radially outwardly, on upper surface 220, from the outer upper edge 365A on top of wall 308A of the slotted openings 265A on is a blade ledge 370A, which is coextensive with the juxtaposed portion of the upper surface 220 of the hub member 200, as shown in the drawings. This blade ledge 307A extends between the side walls of blade boss 360A and 360X. In similar fashion, the remaining blade ledges extend outwardly between adjoining boss members. Variously stated, this blade ledge member 370A, 370B . . . 370X for each slotted opening 265A, 265B . . . 265X is one the same as the adjacent upper surface 220 of the hub member, such blade ledge member 370A, 370B . . . 370X being of a width which is approximately equal to the width, as viewed in FIG. 2 of the mating slotted opening. Alternately stated, juxtaposed between each such blade ledge 370A . . . 370X are the blade bosses 360A, 360B . . . 360X. As seen in the drawings, the blade boss 360A extends between the blade ledge 370A, for slotted opening 265A, and blade ledge 370B for slotted opening 265B. In similar fashion, blade boss 360B extends between blade ledge 370B and blade ledge 370C, and so forth, in the same pattern as the blade bosses and blade ledges extend around the periphery of hub member 200.

The flexible cutting blade members 600A, 600B . . . 600X that are attached to hub member 200 are preferably all of the same structural configuration. Blade 600A as shown in FIG. 3 is a representative structure for all such blades and its description will be considered tantamount to a description of all such blade members to avoid unnecessary repetition. In particular, while these blade members may vary in constructional configuration in each different adaptation, the most preferred embodiment is described as follows. The blade 600A is comprised of a flexible, pliable plastic-like material and is a longitudinally extending, finger-like member, having a flat, narrow and longitudinally extending blade portion 610A. The longitudinally extending blade portion 610A has a radially inner end 620A and a radially outer end 630A as shown in FIG. 3. On the radially inner end 620A of the longitudinal blade member 610A is a securing leg 640A, which is perpendicular to the longitudinal axis of the main blade shank 610A, as shown. The configuration of the blade 600A when viewed in a flat planar view, forms the elevational view shown in FIG. 9, reveals a regular T-shaped configuration. From a side elevational view shown in FIG. 10, the blade 600A appears flat, except for a tapering of the blade towards the radially outer end 630A, as more fully described herein below.

Blade 600A has side cutting edges 650A and 650B, which respective edges function as the cutting edge as the blades rotate in a circular pattern about the locus of drive shaft member 100. As seen in the side elevational view in FIG. 10, the blade 600A tapers to a relatively thinner thickness as it extends radially outward from extreme radially inner edge 670A to extreme radially outer edge 660A, as shown. This tapering effect yields a more efficient aerodynamic surface for the blade to promote a greater efficiency in grass cutting. It must be noted, however, that this tapering effect on blade 600A need not be uniform in a reduced progression, but may vary in width reduction from one end to the other.

The preferred composition for blade 600A is a polyvinal chloride material, although other plastic or similar materials may be used so long as the blade does possess a minimal degree of flexibility. Each additional blade 600B, 600C . . . 600X is of comparable composition and structure as that described for blade 300A.

In one alternate embodiment not shown in the drawings, the blade 600A has one side edge 650A which is more narrow than the opposite edge 650B, giving the blade a knife-edge effect for cutting purposes. Other than such feature, the blade is similar to the blade shown.

As previously indicated, the hub member 200 is the central locus and common connector for all the flexible bladed members, and each blade 600A, 600B . . . 600X is attached to the hub members as follows: The radially outer end 630A of each flexible bladed member 600A . . . 600X is inserted through slotted openings as pictured in FIGS. 5, 6 and 7. Specifically, the radially outer 630A end of blade 600A is threaded into slotted opening 265A by first threading such radially outer end 630A through the upper exposed portion 298A of slotted opening 265A, thence under the bottom surface 340 of the retaining ring 295, and back out through the exposed portion 297A of slotted opening 265A. Thereupon, the radially outer end 630A of blade 600A and the remainder of blade shank 610 is drawn radially outwardly over blade ledge 370A, to the positions shown in FIG. 2. In FIG. 2 it can be seen that the T-shaped end 640A of the blade 600A is fitted against the radially inner surface of ring 295, and this feature blocks the blade 600A from further radially outward movement from the position shown. This essentially locks the blade 600A in position. All remaining blade members are connected to hub 200 in the fashion shown and described above, and are connected in symmetrically dispersed fashion as shown in FIG. 2.

Once all the blades 600A, 600B . . . 600X are inserted on the hub member 200 as shown, the hub member 200 is affixed over the stub shaft 206 of the drive shaft 100, the stub shaft is inserted through shaft receptacle 248 and thence locked in place by retaining nut 252.

When the drive shaft rotates, the individual blade members 600A, 600B . . . 600X rotate in proportionate speed to the hub members revolutionary speed, and the blades are held radially and horizontally erect as they rotate by reason of the blade ledge 370A . . . 370X acting in conjunction with the lateral holding action of the adjoining sides of each blade boss 360A, 360B . . . 360X.

While a preferred embodiment of the subject invention has been described, it is not to be considered as limiting the scope of the subject claims herein.

I claim:

1. A hub for flexible grass cutting blade members for a power lawn mower comprising:
   (a) a circular plate member, with an upper surface and a lower surface, and a circular perimeter, said circular plate member having a plurality of slotted openings extending completely through the plate member from the lower surface to the upper surface, said slotted openings having an access exposure on the lower surface of said plate member and having two access openings in the upper surface thereof;
   (b) ring means having an upper surface and a lower surface integrally disposed on the upper surface of the plate member overlapping at least one of a portion of each said slotted openings; whereby each said slotted opening has two exposed accesses from the upper surface, and an opening to the lower surface;
   (c) a plurality of raised boss members disposed over the upper surface of said plate member, whereby said boss members are disposed in succession intermediate the respective areas of the upper surface of said plate members which are just radially outwardly of the respective slotted members, and wherein said upper surface of said boss members is in the same plane as the upper surface as said ring members;
   (d) a radially outer ledge on the upper surface of said hub member to receive a portion of the blade, said ledge being disposed between adjacent bosses;
   (e) a circular abutment means located radially on the upper surface of said plate member inwardly of the slotted openings to keep the cutting blade members from moving radially inwardly.

* * * * *